C. B. HEBBARD.
AUTOMOBILE LOCK.
APPLICATION FILED JULY 21, 1917.
1,250,313.
Patented Dec. 18, 1917.
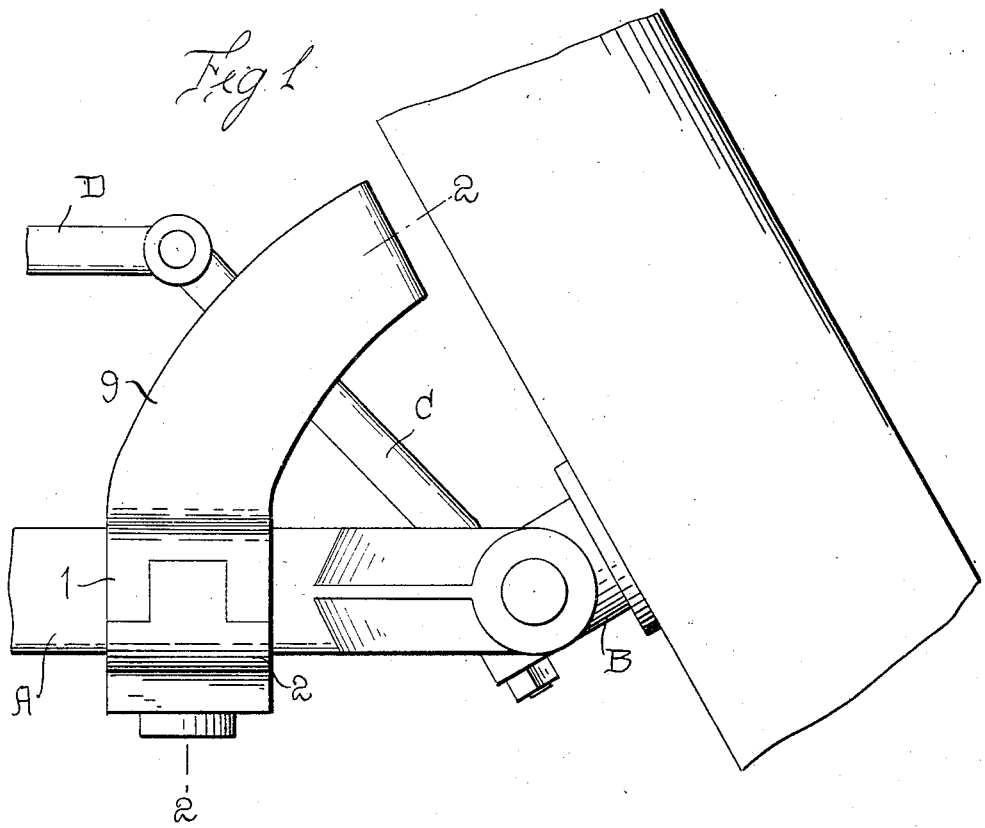
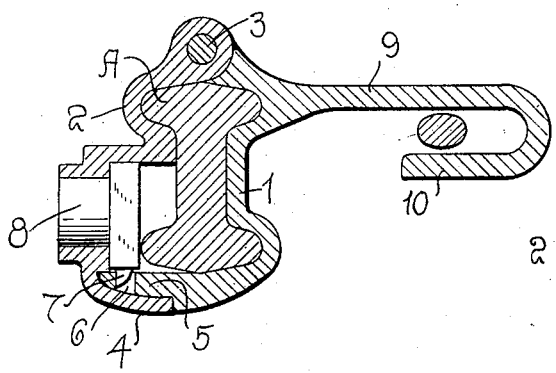
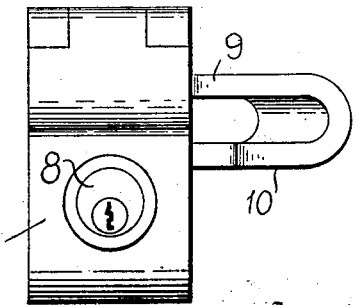
Inventor
CHARLES B. HEBBARD
By Watson E. Coleman
Attorney

UNITED STATES PATENT OFFICE.

CHARLES B. HEBBARD, OF JOPLIN, MISSOURI.

AUTOMOBILE-LOCK.

1,250,313.  Specification of Letters Patent.  Patented Dec. 18, 1917.

Application filed July 21, 1917. Serial No. 182,080.

*To all whom it may concern:*

Be it known that I, CHARLES B. HEBBARD, a citizen of the United States, residing at Joplin, in the county of Jasper and State of Missouri, have invented certain new and useful Improvements in Automobile-Locks, of which the following is a specification, reference being had to the accompanying drawings.

This invention relates to certain improvements in automobile locks and it is an object of the invention to provide a novel and improved device of this general character adapted to coact with the front axle and steering arm of an automobile to prevent the automobile from traveling in a straight line and wherein the steering arm is capable of limited swinging movement so that the radius of the curve of travel of the vehicle may be varied in accordance with the requirements of practice.

In certain municipalities the traffic and insurance regulations require that a locked car shall be capable of movement so that it may be pushed away should occasion require. My improved lock fully meets with these requirements but permits the car to travel only in a circular or curved path of travel so that the possibility of the car being driven or towed in a straight away direction is eliminated.

The invention consists in the details of construction and in the combination and arrangement of the several parts of my improved automobile lock wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein—

Figure 1 is a view in top plan of a lock constructed in accordance with an embodiment of my invention, a co-acting portion of the automobile being shown in fragment;

Fig. 2 is a sectional view taken substantially on the line 2—2 of Fig. 1; and

Fig. 3 is a view in front elevation of my improved lock as herein embodied.

As disclosed in the accompanying drawings A denotes the front axle of an automobile and which has operatively engaged therewith the spindle B. C is a conventional type of the spindle arm co-acting with the spindle B and with which is engaged the steering rod D.

My improved lock comprises two sections 1 and 2 pivotally engaged one with the other as at 3 and the sections 1 and 2 are adapted to snugly engage an end portion of the axle A as particularly illustrated in Fig. 2. As herein disclosed the free end portion 4 of the section 2 overlies the free end portion 5 of the section 1 and the portion 5 is provided with the recess or opening 6 with which co-acts the bolt 7 of the key operated lock 8. By this arrangement it will be at once self evident that my improved device may be readily and conveniently applied to the axle and be secured thereto against unauthorized removal.

Extending rearwardly from the upper portion of the section 1 is the outwardly curved flat arm 9 which has its free end portion returned to afford an inwardly opening hook member 10.

In practice the steering mechanism of an automobile, when the car is at a standstill is operated to swing the arm C substantially to the limit of its inward movement. My improved lock is then applied to the arm 9 which is of such a length as to overlie the arm C and to position the hook member 10 in the line of travel of the arm C. The arm 9 is also of such a length as to prevent the spindle arm C being returned to a position at right angles to the axle A so that the automobile cannot be moved in a straight away direction but can only be moved in a curved or circular path. It is also to be noted that the arm 9 is of such a length as to permit a limited swinging movement of the arm C so that the radius of the curved or circular path of travel of the vehicle may be varied in accordance with the necessities of practice, and preferably within a radius of thirty feet to substantially three hundred feet and therefore it will be at once self evident that with my improved lock operatively engaged with an automobile the same may be readily moved from its parking position should conditions so necessitate but also prevents the car traveling in a straight away direction so that the possibility of the automobile being driven or towed away by unauthorized persons is substantially entirely eliminated.

From the foregoing description, it is thought to be obvious that an automobile lock constructed in accordance with my invention is particularly well adapted for use by reason of the convenience and facility with which it may be assembled and operated and it will also be obvious that my invention is susceptible of some change and modification without materially departing from the principle and spirit thereof and for this reason I do not wish to be understood as limiting myself to the precise arrangement and formation of the several parts herein shown in carrying out my invention in practice except as hereinafter claimed.

I claim:

In combination with an axle, a steering spindle engaged therewith and a steering arm carried by the spindle and substantially at right angles thereto, a lock comprising two sections adapted to snugly engage the axle, locking means carried by the sections for holding the same to the axle, and an arm extending from one of the sections and having its free end portion returned to afford an inwardly facing hook member, said arm being adapted to overlie the spindle arm when said spindle arm is in an angular position relative to the axle, and said returned portion serving to hold the steering arm from returning to a position at substantially right angles to the axle, said arm and returned portion thereof being of such lengths as to permit limited swinging movement of the spindle arm relative to the axle.

In testimony whereof I hereunto affix my signature in the presence of two witnesses.

CHARLES B. HEBBARD.

Witnesses:
 WM. KOHLMAN,
 W. R. SHANKLIN.

Copies of this patent may be obtained for five cents each, by addressing the "Commissioner of Patents, Washington, D. C."